Aug. 14, 1945.　　　　L. B. GREEN　　　　2,382,628
BROACHING APPARATUS
Filed April 23, 1943　　　　2 Sheets-Sheet 1
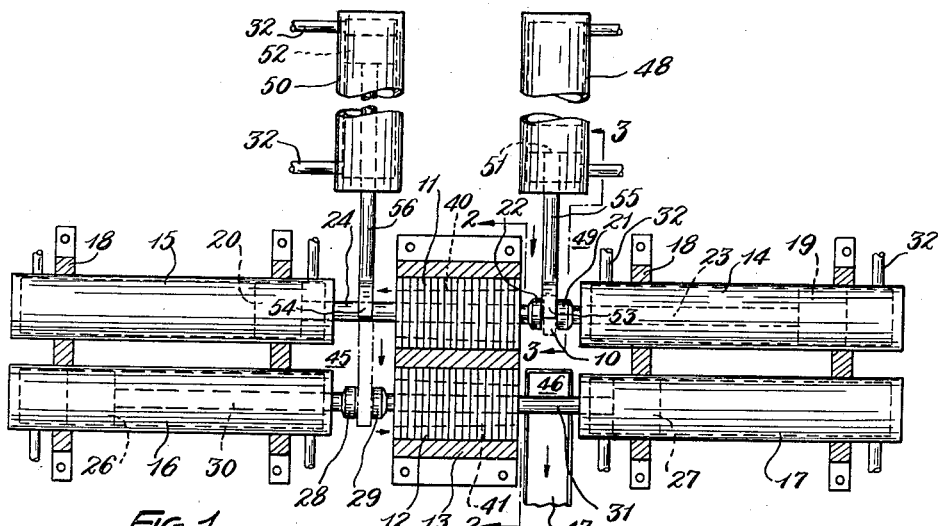
FIG. 1
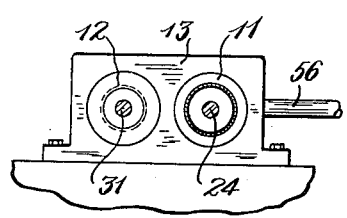
FIG. 2
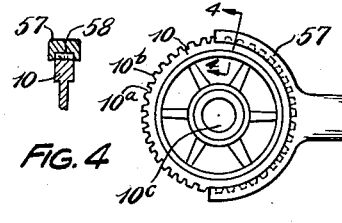
FIG. 4
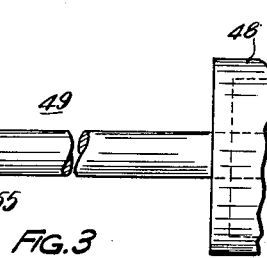
FIG. 3
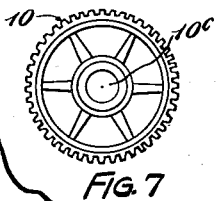
FIG. 7
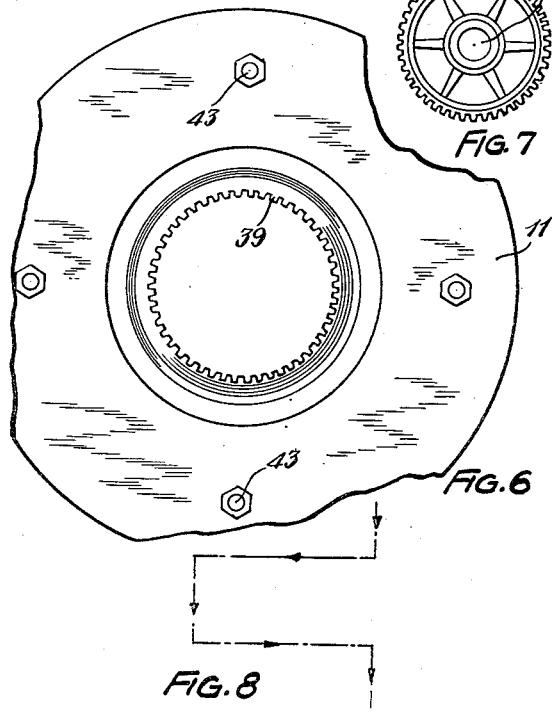
FIG. 6
FIG. 8
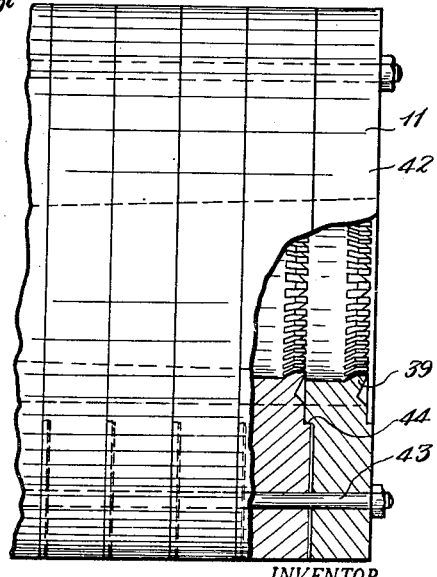
FIG. 5
INVENTOR.
LEE B. GREEN
BY Kwis Hudson & Kent
ATTORNEYS Aug. 14, 1945.  L. B. GREEN  2,382,628
BROACHING APPARATUS
Filed April 23, 1943  2 Sheets-Sheet 2

INVENTOR.
LEE B. GREEN
BY
Kwis, Hudson & Kent
ATTORNEYS

Patented Aug. 14, 1945

2,382,628

UNITED STATES PATENT OFFICE 2,382,628

BROACHING APPARATUS

Lee B. Green, Lakewood, Ohio

Application April 23, 1943, Serial No. 484,186

11 Claims. (Cl. 90—33)

This invention relates to the machining or finishing of metal articles and aims to provide novel apparatus by which the machining of metal articles, and particularly externally toothed articles, can be carried out much more rapidly and economically than heretofore.

Another object of this invention is to provide novel apparatus for machining metal articles involving the use of a die having progressively offset cutting teeth or ridges and a pair of movable chuck members for clampingly holding the article and moving the same across the teeth in cutting engagement therewith.

A further object of my invention is to provide novel apparatus of the character referred to involving the use of cooperating chuck members which are actuated so as to remove an article from a feed dial and push the article through a hollow finishing or broaching die.

Still another object of my invention is to provide novel apparatus of the character mentioned involving the use of substantially parallel hollow dies with rotatable feed dials at opposite ends thereof and in which cooperating chuck members move articles from one dial to the other and, in so doing, push the articles through said dies.

The invention may be further briefly summarized as consisting in certain novel combinations and arrangements of parts hereinafter described in detail and particularly set out in the appended claims.

In the accompanying sheets of drawings,

Fig. 1 is a plan view, with portions broken away, showing one form of apparatus embodying the present invention;

Fig. 2 is a partial transverse sectional view taken on line 2—2 of Fig. 1;

Fig. 3 is another partial transverse sectional view taken on line 3—3 of Fig. 1 and showing the transfer means on a larger scale;

Fig. 4 is a sectional detail view of the blank holder taken on line 4—4 of Fig. 3;

Fig. 5 is a partial plan view showing one of the dies on an enlarged scale and with portions of the die broken away;

Fig. 6 is an end view of the die with portions broken away;

Fig. 7 is a plan view of an article which has been machined or finished by my novel apparatus;

Fig. 8 is a diagram illustrating the path of travel of the blank in the apparatus of Fig. 1;

Figure 9:
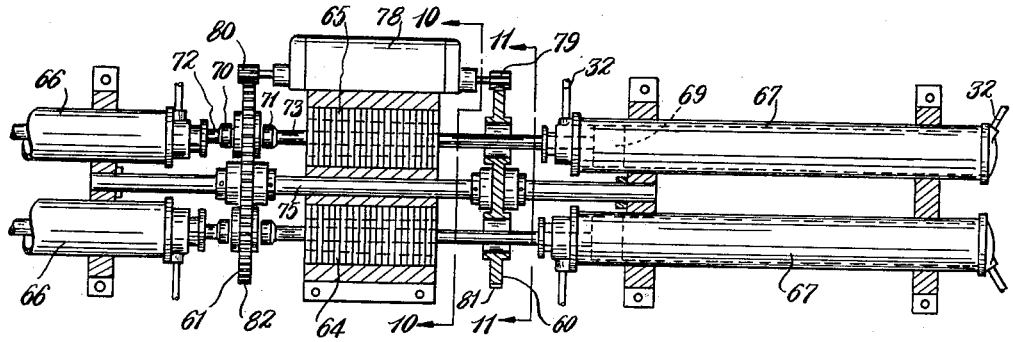
Fig. 9 is a plan view, with portions broken away, showing another form of apparatus embodying the present invention.

As will be apparent from the following detailed description, my invention is applicable to the machining or finishing of a variety of metal work pieces of different kinds and shapes, but is particularly useful in the manufacture of externally toothed bodies including gears, saws, ratchet wheels and the like. In Fig. 7 I have shown a spur gear 10 as an example of an article which can be economically machined or finished by the use of my invention, and in the embodiments of my novel apparatus hereinafter described in detail, the gear 10 represents the work piece or blank being operated upon.

Fig. 1 is illustrative of one form of my novel apparatus and shows machining or external broaching apparatus having a pair of elongated hollow dies or broaches 11 and 12. These dies are disposed in adjacent or coextensive relation with their axes substantially parallel and are suitably held in this relation as by being mounted in a frame member 13. At opposite ends of the die 11 and in substantially coaxial alignment therewith are fluid cylinders 14 and 15 of which the cylinder 14 is a power cylinder and the cylinder 15 is a cushioning or resistance cylinder. Similarly, at opposite ends of the die 12 are fluid cylinders 16 and 17 of which the cylinder 16 is a power cylinder and the cylinder 17 is a cushioning or resistance cylinder. These pairs of cylinders may be held in this desired coaxial alignment with the dies 11 and 12 by suitable frame members 18.

Pistons 19 and 20 are reciprocably operable in the respective cylinders 14 and 15 and are connected with a pair of cooperating chuck members 21 and 22 by means of piston rods 23 and 24 projecting from the adjacent ends of these cylinders. Pistons 26 and 27 are reciprocably operable in the respective cylinders 16 and 17 and are connected with a pair of cooperating chuck members 28 and 29 by means of piston rods 30 and 31 projecting from the adjacent ends of the latter cylinders.

The pairs of cylinders 14, 15 and 16, 17, are preferably double-acting cylinders having pipe connections 32 adjacent their inner and outer ends through which motive fluid is supplied to or exhausted from the cylinders. By appropriately controlling the flow of motive fluid to and from the cylinders, the pairs of chuck members 21, 22 and 28, 29 can be made to clampingly grip the blanks 10 therebetween and to push or carry the blanks, while being thus clampingly held, through the dies 11 and 12. Any suitable motive fluid can be used in the chuck actuating cylinders but I prefer to use hydraulic pressure in the power cylinders 14 and 16 and either hydraulic or air pressure in the cushioning cylinders 15 and 17.

Figure 12:
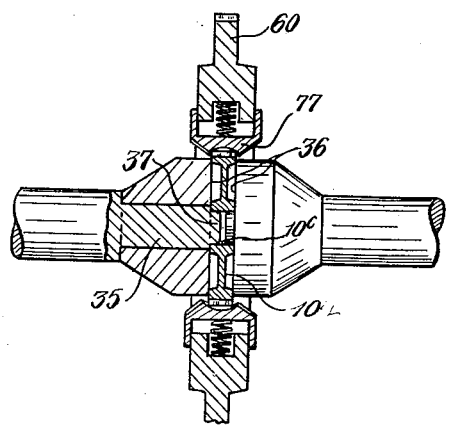
Fig. 12 is an elevational view, partly in section, showing the chuck members engaging the blank while the latter is in the feed dial.

The cooperating chuck members 21, 22, and 28, 29 may all be of similar construction and may each comprise a head carried by a reduced or shouldered portion 35 of the corresponding piston rod (see Fig. 12). The size and shape of the chuck members will vary in accordance with the size and shape of the blanks to be held thereby and in this instance the chuck members are circular and have adjacent clamping faces 36 which engage the blank 10 so as to support and more or less rigidly hold the rim portion of the blank just inwardly of the peripheral portion in which the recesses 10a are to be cut in forming the teeth 10b. The chuck members may also be provided with means for centering the blank with respect to the longitudinal axis of the dies and in this instance such centering means is provided by projecting portions 37 of the piston rods, which portions are adapted to extend into the hub opening 10c of the blank from opposite ends thereof.

Reverting to the dies 11 and 12, it should be explained that these hollow dies or broaches have internal cutting teeth or ridges 39 which are progressively offset different radial distances from the axis so that as the blank is pushed or carried through the die by the chuck members the portions of the blank to be machined or finished, in this instance the peripheral portions of the gear blank 10, are moved across the teeth or ridges in succession and in cutting engagement therewith. By reason of the progressive offset of the teeth or ridges, the passages through the dies will be tapered. Thus in Fig. 1 the passage 40 of the die 11 tapers or narrows progressively toward the cylinder 15 and the passage 41 of the die 12 tapers or narrows progressively toward the cylinder 17. The dies 11 and 12 may be of any suitable construction but I prefer to use a sectional construction in which each die is made up of a series of sections 42 which may be held in contiguous relation and coaxial alignment as by means of clamping rods 43 and the interfitting annular shoulders 44. In the case of the dies 11 and 12 shown in this instance, each of the sections 42 is a disk-like section having a central opening surrounded by an annular series of the internal cutting teeth 39.

With the construction and arrangement above described for the dies 11 and 12 and their chuck actuating cylinders 14, 15, and 16, 17, it will be seen that with the chuck members 21 and 22 at the blank-receiving station in which they are shown in Fig. 1, a blank 10 can be placed between these chuck members and by appropriate actuation of the pistons 19 and 20 can be clampingly held by such chuck members and pushed or carried through the die 11 to a transfer station 45 at the opposite end of the die 11. During its travel through the die 11, the outer periphery of the blank 10 will move across the cutting teeth 39 and will be subjected to a machining or finishing operation by which the grooves and teeth 10a and 10b are formed or partially formed thereon.

At the transfer station 45 the clamping engagement of the chuck members 21 and 22 with the blank 10 is released and the blank is transferred to a position in alignment or register with the axis of the die 12 at which time it is clampingly engaged by the chuck members 28 and 29 which are then in the position shown in Fig. 1 in readiness to receive the blank therebetween. By appropriate actuation or control of the pistons 26 and 27, the chuck members 28 and 29 are made to clamp the blank therebetween and push the same while thus clampingly held through the die 12 toward the cylinder 17 and to an unloading station 46 at the opposite end of the die 12. During its travel through the die 12, the blank is subjected to a second or final finishing or machining operation by being moved across the cutting teeth 39 in cutting engagement therewith. At the unloading station 46 the clamping engagement of the chuck members 28 and 29 is released and the machined blank is removed therefrom as by permitting the blank to drop into the chute 47.

The feeding of the blanks to the chuck members 21 and 22 at the receiving station, and the transferring of the blanks from chuck members 21, 22, to chuck members 28, 29, at the transfer station 45 can, if desired, be carried out by the use of suitable transfer mechanism. To this end I provide a double-acting fluid cylinder 48 adjacent a loading station 49 located laterally outwardly of the receiving end of the die 11, and a double-acting fluid cylinder 50 adjacent the transfer station 45. Pistons 51 and 52 are reciprocably operable in the cylinders 48 and 50 and are connected respectively with work holders 53 and 54 by piston rods 55 and 56 projecting from the inner ends of these cylinders. The work holder 53 moves back and forth between the loading station 49 and the position in which it is shown in Fig. 1. One of the blanks 10 is manually placed in the holder 53 while the latter is at the loading station 49. The work holder 54 moves back and forth between its full line and broken line positions shown in Fig. 1.

The work holders 53 and 54 may be of any suitable construction which will enable these members to temporarily and releasably hold the blanks 10 in a manner suitable for feeding and transfer purposes. The shape and construction of the work holders will vary in accordance with the shape of the work pieces to be held and, in this instance, I show the work holders 53 and 54 as being in the form of a substantially semi-circular head 57 having arcuate integral grooves 58 in which the blanks 10 are received and temporarily held in a manner to permit the blanks to be removed therefrom by the cooperating chuck members.

By appropriately controlling the flow of motive fluid to and from the cylinders 48 and 50 through the pipe connections 32, the work holders 53 and 54 can be actuated in properly timed relation to the actuation of the chuck members so that blanks will be successively fed to the chuck members 21 and 22 at the receiving station by the holder 53 and will be transferred in succession from the chuck members 21, 22, to the chuck members 28, 29, at the transfer station 45. Fig. 8 illustrates diagrammatically the path of the above described movement or travel of the blank 10 in the apparatus and method of Fig. 1.

Figure 10:
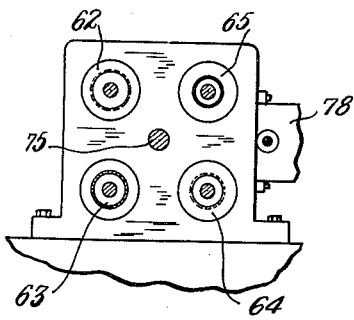
Fig. 10 is a partial transverse sectional view taken through the apparatus on line 10—10 of Fig. 9.
Figure 11:
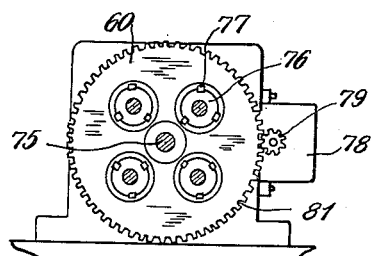
Fig. 11 is another partial transverse sectional view taken on line 11—11 of Fig. 9.

In Figs. 9 to 11 I show another form of my machining or broaching apparatus. This modified form of apparatus is generally similar to the apparatus of Fig. 1 but employs rotatable feed and transfer dials 60 and 61 instead of the work holders 53 and 54. The modified apparatus embodies four substantially parallel hollow dies 62, 63, 64 and 65, having the internal cutting teeth 39, and a pair of fluid cylinders 66 and 67 for each die. One cylinder of each pair is a hydraulically actuated power cylinder and the other cylinder is a hydraulically or air actuated cushioning or resistance cylinder. All of the cylinders are double-acting and have fluid connections 32 at both ends thereof and have reciprocably operable pistons 69 therein. Cooperating chuck members 70 and 71 arranged in paired relation are connected with the pistons by the piston rods 72 and 73 and one such pair of chuck members serves each of the dies and is movable coaxially thereof for gripping or releasing the blanks 10 and for pushing or carrying the blanks through the dies while clampingly held by such chuck members.

The feed and transfer dials 60 and 61 may be disk-like members located at opposite ends of the dies and rotatably mounted on a centrally disposed shaft 75. Each of the dials has four circumferially spaced openings 76 therethrough for receiving the blanks 10. Each of the openings may be provided with a plurality of internal spring-pressed dogs 77 for releasably holding the blanks 10 in the openings 76 (see Fig. 12). The dials are rotated with a step-by-step movement in properly timed relation to the actuation of the cooperating chuck members 71 and 72. This rotary movement can be imparted to the dials by suitable mechanism such as an electrically controlled power device 78 having driving pinions 79 and 80 which mesh with peripheral gears 81 and 82 provided on the dials 60 and 61.

Figure 13:
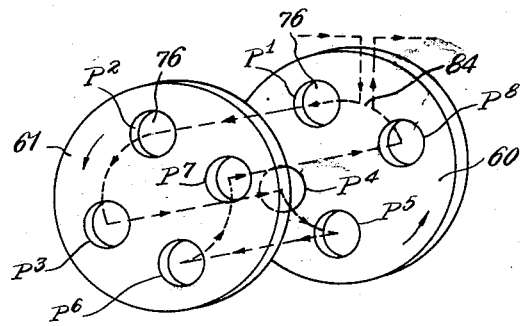
Fig. 13 is a diagram in perspective showing the path of travel of the blank in the apparatus and method of Fig. 9.

In Fig. 13 I have illustrated diagrammatically the path of travel of a blank 10 in the apparatus illustrated in Figs. 9 to 11. As represented in this view the loading and unloading station is at the point 84 adjacent the dial 60. The dial is indexed to bring one of its openings at the loading station 84 and a blank 10 is manually inserted into such opening. The dial is then indexed to bring the loaded opening to the position $p^1$, thereby moving the blank to a position between a pair of the chuck members 71 and 72. These chuck members are then closed to clampingly engage the blank and are further actuated to remove the blank from the dial 60 and carry or push the same through the die 62 and into an opening 76 of the dial 61 which opening then occupies the position $p^2$. The chuck members then release the partially machined blank leaving the same in the dial 61 which is then indexed to carry the blank to the position $p^3$. At $p^3$ the blank is picked up by a second pair of chuck members and is removed from the dial 61 and pushed or carried through the die 63 and deposited in another opening of the dial 60 which is then at the position $p^4$. The dial 60 is then indexed further to move the partially machined blank to the position $p^5$. At $p^5$ the blank is picked up by a third pair of chuck members and is carried or pushed through the die 64 and redeposited in an opening of the dial 61 which is then at the position $p^6$. The dial 61 is then indexed to carry the blank to the position $p^7$ at which a fourth pair of chuck members pick up the blank and after pushing it through the die 65 deposit the same in an opening of the dial 60 which is then at the position $p^8$. The dial 60 is then indexed to carry the machined blank from the position $p^8$ back to the station 84 at which point the blank is removed from the dial and a new blank is substituted preparatory to another cycle of operation. It will be understood, of course, that other blanks can be started through the apparatus before the completion of the blanks whose travel is traced above. Likewise, it is apparent that the loading and unloading of the dial 60 could be done at the station $p^8$ instead of at the point 84.

Figure 14:
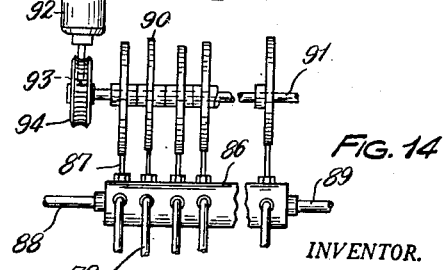
Fig. 14 is a partial plan view showing control means for use with the machining apparatus of Fig. 1.

In Fig. 14 I show control apparatus which may be employed for controlling the fluid cylinders for actuating the pairs of chuck members in the desired timed relation. This control apparatus may comprise a manifold 86 containing a plurality of valves 87 whose actuating stems project from the manifold. Pressure fluid is supplied to the manifold by the pipe 88 and fluid is exhausted or carried away from the manifold by the pipe 89. A plurality of branch pipes 32 connect the manifold with the ends of the double-acting fluid cylinders associated with the machining dies. The flow of fluid to and from the cylinders through the pipes 32 is controlled by the valves contained in the manifold 86, one of such valves being provided for each of the branch pipes 32. These valves may be suitably actuated in the necessary timed relation by rotary cams 90 carried by a shaft 91 which is driven from a motor 92 by means of the worm 93 and worm gear 94. When the control apparatus of Fig. 14 is used in connection with the apparatus shown in Fig. 1, additional valves are provided in the manifold 86 for controlling the flow of fluid to and from the feed and transfer cylinders 49 and 50.

Figure 15:
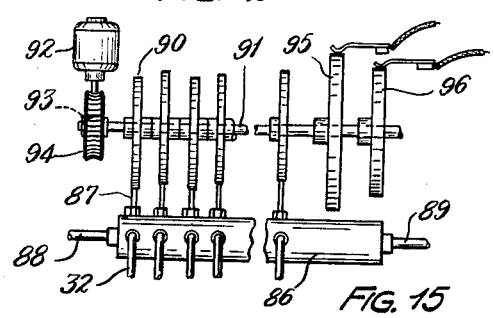
Fig. 15 is a partial plan view showing similar control means for use with the apparatus of Fig. 9.

In Fig. 15 I show control apparatus which is substantially the same as that of Fig. 14 except that it also embodies rotary switch elements 95 and 96 on the shaft 91. The control means of Fig. 15 can be used with the apparatus of Fig. 9 in which case the valves 87 of the manifold control the timed operation of the cylinders 66 and 67, and the switches 95 and 96 control the power device 78 so that the feed and transfer dials 60 and 61 will be indexed in properly timed relation to the actuation of the cylinders 66 and 67.

In the drawings and detailed description I have disclosed forms of machining apparatus which embody, respectively, two dies and four dies, but it will be understood that the invention also contemplates similar apparatus using a smaller, larger, or intermediate number of dies. If the work is such that it can be machined in a single pass, then, of course, only one die would be needed. Throughout the foregoing description I have referred to only one blank being held between a pair of the cooperating chuck members but a plurality of blanks to so held and carried if desired.

From the foregoing description and the accompanying drawings it will now be readily understood that I have provided novel apparatus for machining or broaching metal articles and with which various kinds of articles, including externally toothed bodies, can be machined or finished much more rapidly and economically than heretofore.

While I have illustrated and described my machining apparatus in considerable detail, it will be understood of course that I do not wish to be correspondingly limited but regard my invention as including all changes and modifications coming within the scope of the appended claims.

Having thus described my invention, I claim:

1. In apparatus of the character described, a hollow broach, cylinders on opposite sides of said broach, pistons in said cylinders, and a pair of cooperating chuck members connected with said pistons for actuation thereby, said pistons and chuck members operating to hold a blank between the chuck members and carry the blank through said broach.

2. In apparatus of the character described, a hollow broach, a power cylinder on one side of the broach, a cushion cylinder on the other side of the broach, pistons in said cylinders, and a pair of chuck members connected with said pistons, said pistons and chuck members operating to hold a blank between the chuck members and carry the blank through said broach.

3. In apparatus of the character described, a pair of adjacently located elongated hollow broaches, a pair of chuck members movable substantially coaxially of one of the hollow broaches, means for actuating said chuck members to cause the same to grip a blank and move the same through said one broach, a second pair of chuck members movable substantially coaxially of the other hollow broach, and means for actuating said second pair of chuck members to cause the same to grip said blank and move the same in the opposite direction through said other broach.

4. In apparatus of the character described, a pair of adjacently located elongated hollow broaches, a pair of chuck members movable substantially coaxially of one of the hollow broaches, means for actuating said chuck members to cause the same to grip a blank and move the same through said one broach, a second pair of chuck members movable substantially coaxially of the other hollow broach, means for actuating said second pair of chuck members to cause the same to grip said blank and move the same in the opposite direction through said other broach, and means operable to transfer a blank from the first pair of chuck members to said second pair of chuck members.

5. In apparatus of the character described, an elongated hollow broach, a feed dial extending transversely of the broach at one end thereof, said dial having therein openings adapted to carry blanks and being rotatable for moving the blanks in succession to a position opposite said broach, a pair of cooperating movable chuck members adapted to clamp a blank therebetween and move the same out of the dial opening and through said broach, and means for actuating said chuck members.

6. In apparatus of the character described, a plurality of adjacently located elongated hollow broaches, a rotatable feed dial at one end of said broaches and having blank-receiving openings therein, a rotatable transfer dial at the other end of said broaches and having blank-receiving openings therein, a pair of cooperating chuck members for each broach, each pair of chuck members being adapted to clamp a blank therebetween and being movable substantially coaxially of the corresponding broach for pushing the blank therethrough and for transferring the blank from one dial to the other, means for actuating the pairs of chuck members, and means for imparting rotary movement to said dials.

7. In broaching apparatus of the character described, a pair of cooperating coaxially movable chuck members having portions adapted for clamping engagement with opposite sides of a spur gear blank of the kind having a central opening, said chuck members being of a size and shape to apply clamping pressure to said blank around and immediately adjacent the peripheral portion in which the gear teeth are to be cut and also having axial projections engageable in said central opening for centering the blank with respect to the common axis.

8. Apparatus of the character described comprising a hollow broach, a pair of cooperating chuck members for clamping a blank and moving the same through said broach, said chuck members being of a size and shape to clampingly engage the blank immediately adjacent the peripheral portions thereof to be machined by said broach, and means for actuating said chuck members to cause the same to clamp said blank therebetween and advance the blank in said broach while thus clamped.

9. Apparatus of the character described comprising a hollow broach, a pair of cooperating chuck members for clamping a blank and moving the same through said broach, said chuck members being of a size and shape to clampingly engage the blank immediately adjacent the peripheral portions thereof to be machined by said broach, and power devices on opposite sides of said broach and connected with the respective chuck members, said power devices being operable to cause the chuck members to clamp the blank therebetween and advance the blank in said broach while thus clamped.

10. In apparatus of the character described, an elongated hollow broach, a feed member adjacent one end of the broach, said feed member having a blank-holding means thereon and being movable transversely of the broach to shift said holding means into and out of register with said broach, means for moving said feed member, a pair of cooperating chuck members adapted to clamp a blank therebetween, said chuck members being operable to remove a blank from said holding means and advance the blank in said hollow broach, and means operating from opposite ends of said broach and connected with said chuck members for actuating the same.

11. In apparatus of the character described, a pair of adjacently located elongated hollow broaches, a feed member adjacent one end of one of said broaches, said feed member having a blank-holding means thereon and being movable transversely of said one broach to shift said holding means into and out of register with said one broach, means for moving said feed member, a transfer member adjacent the other ends of said broaches, said transfer member having blank-holding means thereon and being movable transversely of said broaches to shift said holding means from a position in register with said one broach to a position in register with the other broach and vice versa, means for moving said transfer member, a pair of cooperating chuck members movable axially of said one broach, said chuck members being operable to remove a blank from the holding means of said feed member and to carry the blank through said one broach to the holding means of said transfer member, means operating from opposite ends of said one broach and connected with the first pair of chuck members for actuating the same, a second pair of chuck members movable axially of said other broach, said second pair of chuck members being operable to remove a blank from the holding means of said transfer member and to carry the blank through said other broach, and means operating from opposite ends of said other broach and connected with said second pair of chuck members for actuating the same.

LEE B. GREEN.